(12) United States Patent
Towata

(10) Patent No.: US 9,075,971 B2
(45) Date of Patent: Jul. 7, 2015

(54) INFORMATION PROCESSING SYSTEM, IMAGE PROCESSING APPARATUS, USER DEVICE, CONTROL METHOD, AND STORAGE MEDIUM

(75) Inventor: Hiroaki Towata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/612,999

(22) Filed: Sep. 13, 2012

(65) Prior Publication Data

US 2013/0097686 A1    Apr. 18, 2013

(30) Foreign Application Priority Data

Oct. 14, 2011  (JP) .................. 2011-226746

(51) Int. Cl.
G06F 21/00 (2013.01)
G06F 21/31 (2013.01)
G06F 21/60 (2013.01)

(52) U.S. Cl.
CPC .............. G06F 21/31 (2013.01); G06F 21/608 (2013.01)

(58) Field of Classification Search
CPC ........ G06F 21/00; G06F 21/31; G06F 21/608
USPC ........... 726/2–9; 713/168–174, 182–186, 202
See application file for complete search history.

(56) References Cited

U.S. PATENT DOCUMENTS

| 6,307,640 | B1 | 10/2001 | Motegi |
| 8,681,357 | B2 | 3/2014 | Sato et al. |
| 8,819,117 | B2 | 8/2014 | Moriwaki |
| 2003/0081788 | A1 | 5/2003 | Simpson et al. |
| 2007/0127051 | A1 | 6/2007 | Sakayama et al. |
| 2007/0297666 | A1 | 12/2007 | Takeuchi et al. |
| 2008/0252928 | A1* | 10/2008 | Takatani ............ 358/1.15 |
| 2008/0256459 | A1* | 10/2008 | Sekiya ............... 715/741 |
| 2009/0037981 | A1* | 2/2009 | Kino .................. 726/2 |

(Continued)

FOREIGN PATENT DOCUMENTS

| CN | 101918978 A | 12/2010 |
| EP | 1465052 A | 10/2004 |

(Continued)

OTHER PUBLICATIONS

European Search Report issued in corresponding application No. 12006784.8 on Feb. 15, 2013.

(Continued)

*Primary Examiner* — Evans Desrosiers
(74) *Attorney, Agent, or Firm* — Carter, DeLuca, Farrell & Schmidt, LLP

(57) ABSTRACT

A mediation service accepts a coordination instruction for coordinating a web application server with a coordination device from a web browser, generates a script to be authenticated by an authentication method corresponding to the server, and transmits the generated script to the coordination destination service providing system indicated by the coordination instruction. The web browser transmits authentication information or an authentication token, which is obtained in response to an input operation on an authentication information input screen displayed by execution of the script, to the coordination device. Then, the coordination device receives and saves the authentication information or the authentication token.

8 Claims, 13 Drawing Sheets

(56) References Cited

U.S. PATENT DOCUMENTS

| | | | |
|---|---|---|---|
| 2009/0201551 A1* | 8/2009 | Uchida | 358/1.15 |
| 2009/0213412 A1* | 8/2009 | Fukasawa | 358/1.14 |
| 2010/0132035 A1 | 5/2010 | Nanaumi | |

FOREIGN PATENT DOCUMENTS

| | | |
|---|---|---|
| JP | 2011-003100 A | 1/2011 |
| JP | 2011-114538 A | 6/2011 |

OTHER PUBLICATIONS

Hungarian Search Report issued in corresponding Singapore application No. 201207321-9 on Feb. 13, 2014.

Chinese Office Action issued in corresponding application No. 201210388293.6 on Mar. 18, 2015.

Korean Office Action issued in corresponding application No. 10-2012-0110502 on Feb. 9, 2015.

* cited by examiner

```
<script type="text/javascript">
<!--
location.href = "https://www.serviceA.com/accounts/OAuthGetAccessToken?
&callback_url=http://192.168.0.3/auth/
//-->
</script>
```

```
<script language="JavaScript">
<!--
var password;
var id;
function fnc_prompt1(){
    var msg;
    msg = window.prompt("Please enter user ID of service B","");
    id = msg;
}
function fnc_prompt2(){
    var msg;
    msg = window.prompt("Please enter password of service B","");
    password = msg;
}
fnc_prompt1()
fnc_prompt2()
locat
```

FIG. 8A

Coordinate coordination device with web application  801

List of coordination devices

Please press coordination button for device to be coordinated with web application

| Cooperation device name | IP address | Service A | Service B |
|---|---|---|---|
| Device A | 192.168.0.2 | Cooperated | Cooperated |
| Device B | 192.168.0.3 | Cooperate | Cooperate |
| Device C | 192.168.0.4 | Cooperate | Cooperate |

805 http://auth.service/deviceList/

FIG. 8B

Authorization screen  802

Is it ok to authorize?

Do you authorize operation for content of print service of device B?

[OK]  [Cancel]

FIG. 8C

Authentication screen  803

Please input authentication information for web application.

Authentication information is saved only in device B. Mediation service does not save authentication information.

ID [User 1]
Password [**********]

[OK]  [Cancel]

Http://192.168.0.3/auth/

FIG. 8D

Cooperate cooperation device with web application  804

List of cooperation devices

Please press cooperation button for device to be cooperated with web application

| Cooperation device name | IP address | Service A | Service B |
|---|---|---|---|
| Device A | 192.168.0.2 | Coordinated | Coordinated |
| Device B | 192.168.0.3 | Coordinated | Coordinated |
| Device C | 192.168.0.4 | Coordinate | Coordinate | http://auth.service/deviceList/

| 901 | 902 | 903 | 904 | 905 |
|---|---|---|---|---|
| Local user ID | Service ID | User ID | Password | Authentication token |
| Local User A | ServiceA | | | ld04otkbmrldohnn |
| Local User A | ServiceB | | | ~p4krif8rjk4iri8 |
| Local User A | ServiceC | Service User 1 | ******** | |
| Local User B | ServiceA | | | feaoenfinne |
| Local User B | ServiceB | | | rokltkgielleop |
| Local User B | ServiceC | Service User 2 | ******** | |

| 911 | 912 | 913 |
|---|---|---|
| Service ID | Service name | Authentication method |
| ServiceA | Service A | OAuth |
| ServiceB | Service B | Basic |

| 921 | 922 | 923 |
|---|---|---|
| Device ID | IP address | Device name |
| dca | 192.168.0.2 | Device A |
| dcb | 192.168.0.3 | Device B |
| dcc | 192.168.0.4 | Device C |

| 931 | 932 |
|---|---|
| Application ID | Authentication token |
| App A | dpelttigkk |
| App B | //c:dpfl,e |
| App C | Leofidkem, |

| 941 | 924 | 925 |
|---|---|---|
| User ID | Service A | Service B |
| User A | Coordinated | Coordinated |
| User B | Not-coordinated | Coordinated |
| User C | Not-coordinated | Not-coordinated |

| 941 | 942 |
|---|---|
| User ID | Password |
| User A | ******** |
| User B | ******** |
| User C | ******** |

INFORMATION PROCESSING SYSTEM, IMAGE PROCESSING APPARATUS, USER DEVICE, CONTROL METHOD, AND STORAGE MEDIUM

BACKGROUND OF THE INVENTION

1. Field of the Invention

The present invention relates to an information processing system, an image processing device, a user device, a control method, and a storage medium.

2. Description of the Related Art

There is a technology for creating and saving content on a web application by accessing the web application by a user using a web browser provided in a user device. The web application can not only create and save data on a web browser but also register and acquire content from a third-party application using an API (Application Program Interface).

A main feature of cloud computing is that the cloud computing executes data conversion and data processing in a distributed manner using many computing resources so as to process requests from many clients in a simultaneous manner. At present, too many vendors that provide various types of services by implementing Web services on a cloud computing environment (hereinafter referred to as "on the cloud") for realizing the cloud computing have been increased.

An information processing system is contemplated in which a web application that functions as a service providing server located in the cloud provides a service in response to a request from a user device. In the information processing system, an information processing device such as a printer, a mobile device, or the like specified by a user executes processing corresponding to the services in coordination with a web application. For example, the web application generates and holds print data in response to a print request from a user device, and the information processing device such as an image processing device acquires the print data from the web application and prints the print data.

In order for a third-party application implemented in the image processing device to perform processing for print data on a web application, communication needs to be established in conformance with an API for the web application. Also, in order for the third-party application to communicate with the web application using an API, authentication needs to be performed by an authentication method in response to the web application.

Here, there has been proposed a conventional technology which causes a web application to execute authentication processing in response to the web application as follows. A user directly inputs authentication information such as his/her user ID, password, or the like, which is used for authentication processing when a web application provides a service, to a third-party application implemented in an image processing device. Then, the third-party application makes an acquisition request for print data including the authentication information to, for example, the web application. The web application executes authentication processing using the authentication information included in the acquisition request for print data and transmits print data to the image processing device if authentication is successful.

Also, Japanese Patent Laid-Open No. 2011-3100 discloses a system in which an authentication request conversion device transfers authentication information, which is used for authentication processing that is executed by a web application upon provision of a service, to a third-party application. The authentication request conversion device redirects by adding authentication information such as a user ID, a password, and the like as URL parameters to the third-party application in response to an access from a web browser provided in a user device. If the authentication request conversion device is applied to provide authentication information to an image processing device, the authentication request conversion device functions as a mediation server that mediates acquisition of authentication information by the image processing device.

However, in the aforementioned conventional technology in which a user directly inputs authentication information to a third-party application implemented in an image processing device, inputting authentication information is very complicated, and thus, considerable time and labor are required for a user. Also, if the third-party application is implemented in a shared device that is shared with a plurality of users, the shared device is undesirably occupied by a certain user during the time in which the user inputs authentication information.

Also, when the authentication request conversion device disclosed in Japanese Patent Laid-Open No. 2011-3100 is used, the authentication request conversion device (mediation server) itself firstly holds authentication information. Consequently, a mediation server may be attacked from outside, resulting in leakage of authentication information such as a user ID, a password, or the like. Furthermore, there is a possibility of wire tapping of authentication information in a communication path. Thus, an information processing system which causes an image processing device to acquire authentication information without holding authentication information by a mediation server and without inputting authentication information directly to the image processing device by a user is needed.

SUMMARY OF THE INVENTION

The information processing system of the present invention causes an image processing device in coordination with a service providing server to acquire authentication information without holding authentication information by a mediation server and without inputting authentication information directly to the image processing device by a user.

According to an aspect of the present invention, an information processing system is provided that includes a service providing system that provides a web service in response to a request from a user device; an image processing device that executes image processing utilizing the web service in coordination with the service providing system; and a mediation system that mediates provision of authentication information to be used by the image processing device when the image processing device coordinates with the service providing system. The mediation system includes an acceptance unit configured to accept a coordination instruction for coordinating the service providing system with the image processing device from the user device via a network; and a generation unit configured to generate a script to be authenticated by an authentication method corresponding to the service providing system and transmit the generated script to the user device. Also, the user device includes a display unit configured to display an authentication information input screen corresponding to the service providing system, which is a coordination destination, by executing the script transmitted from the mediation system; and a transmission unit configured to transmit authentication information input on the authentication information input screen or an authentication token issued by the service providing system depending on the input of authentication information on the authentication information input screen to an image processing device specified by the script. Also, the image processing device includes a saving unit configured to receive the authentication information or the authentication token from a transmission unit provided in the user device and save the authentication information or the authentication token; and an authentication unit configured to receive authentication from the service providing system using the saved authentication information or authentication token.

Further features of the present invention will become apparent from the following description of exemplary embodiments with reference to the attached drawings.

BRIEF DESCRIPTION OF THE DRAWINGS

FIG. 7A is a diagram illustrating an exemplary script using an OAuth authentication method.

FIG. 7B is a diagram illustrating an exemplary script using a Basic authentication method.

FIGS. 8A to 8D are diagrams illustrating screens for coordinating a coordination device with a web application.

FIG. 9A is a diagram illustrating a table which is held by a coordination device.

FIGS. 9B and 9C are diagrams illustrating tables which are held by a mediation server.

FIGS. 9D and 9E are diagrams illustrating tables which are held by a web application server.

DESCRIPTION OF THE EMBODIMENTS

Figure 1:
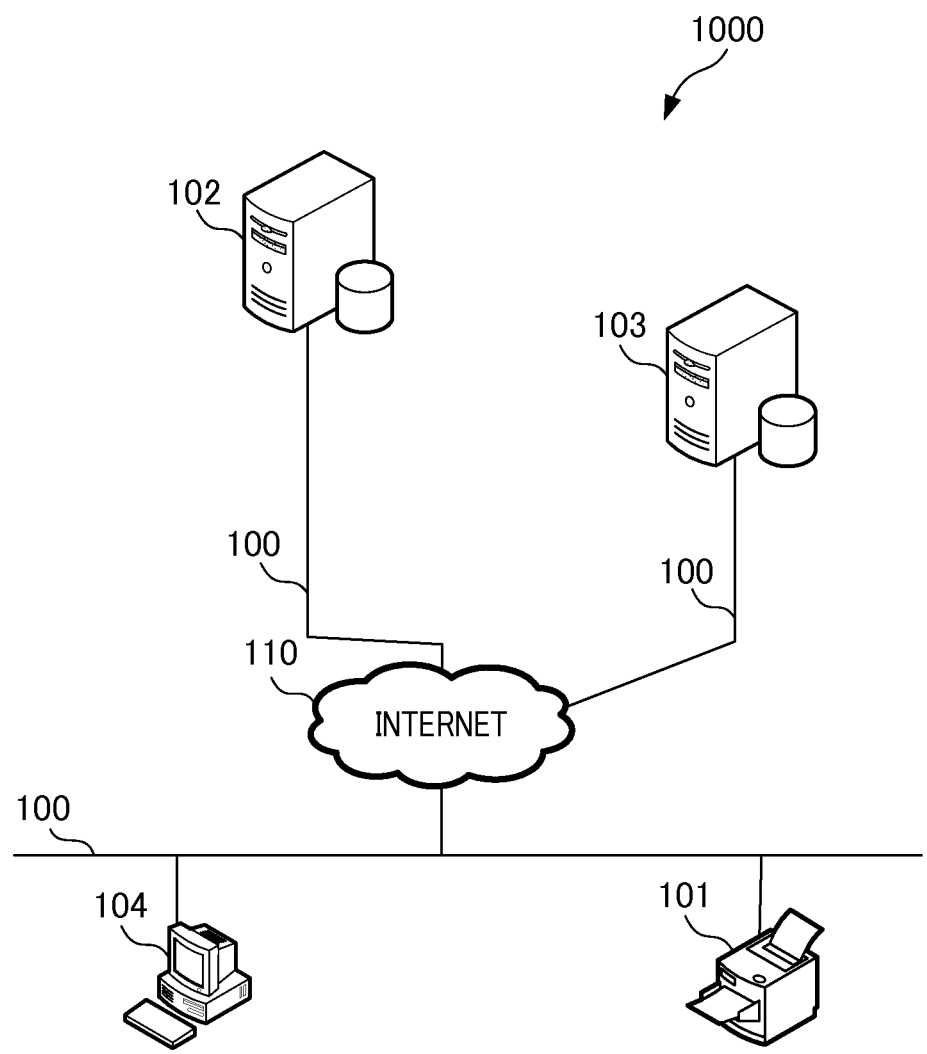
FIG. 1 is a diagram illustrating an exemplary configuration of a system according to a first embodiment.

FIG. 1 is a diagram illustrating an exemplary configuration of a system according to a first embodiment of the present invention. A coordination system 1000 is an information processing system of the present embodiment. The coordination system 1000 includes a client computer 104 and a coordination device 101. The client computer 104 and the coordination device 101 are devices which are located in a user environment and are connected to each other via a network 100. The network 100 is connected to Internet 110.

Also, the coordination system 1000 includes a web application server 103 (hereinafter referred to simply as "application server 103") and a mediation server 102. The application server 103 and the mediation server 102 are connected to the network 100 and the network 100 is connected to the Internet 110. The devices and the server groups constituting the coordination system 1000 are connectable to each other via the Internet 110 and can perform data communication with each other. The number of the respective devices shown in FIG. 1 is one but the number of the respective devices may also be in plural.

Figure 2:
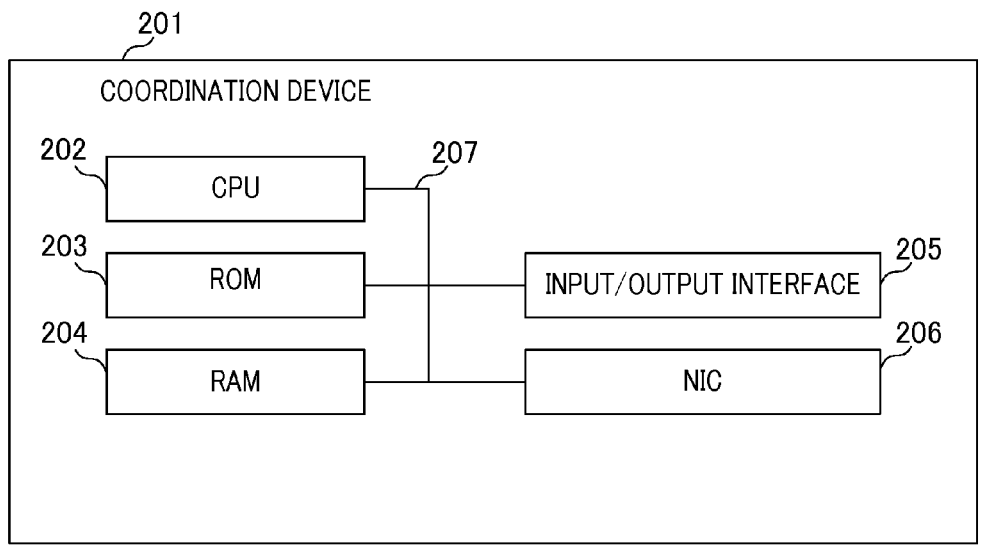
FIG. 2 is a diagram illustrating the hardware configuration of the devices constituting a coordination system.

FIG. 2 is a diagram illustrating the hardware configuration of the devices constituting the coordination system 1000. The devices 201 constitute the coordination system 1000. A CPU (Central Processing Unit) 202 is a unit that executes various programs and realizes various functions.

A ROM (Read Only Memory) 203 is a unit that stores various programs. A RAM (Random Access Memory) 204 is a storage unit that functions as a work area or a temporary storage area for the CPU 202. The CPU 202 loads a program stored in the ROM 203 to the RAM 204 to thereby execute the program. An Input/Output interface 205 transmits data to a display (not shown) connected to each of the devices and the server groups.

Also, the Input/Output interface 205 receives data from a pointing device (not shown). An NIC (Network Interface Card) 206 connects the devices constituting the coordination system 1000 to the network 100. The units can provide data transmission/reception via a bus 207.

Also, the coordination device 101 is the image processing device of the present embodiment. The coordination device 101 is, for example, an image forming device. When the coordination device 101 is the image forming device, the coordination device 101 incorporates a print unit (not shown), and the print unit can transmit/receive data to/from the units via the bus 207. Note that the print unit can print a raster image onto a recording medium.

Figure 3:
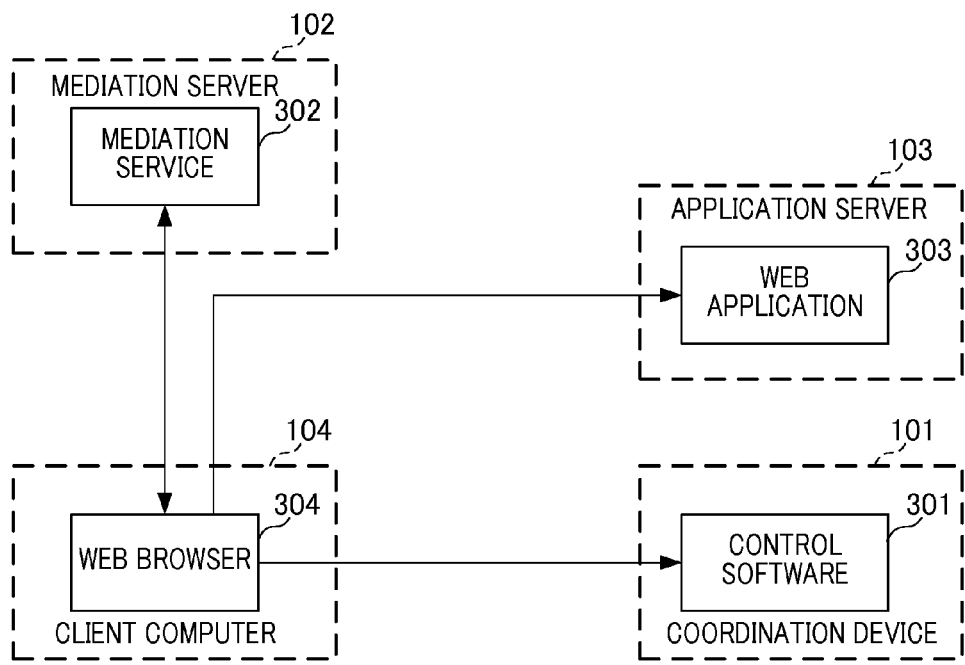
FIG. 3 is a diagram illustrating the software configuration of the devices constituting a coordination system.

A description will be given of the functions achieved by the devices and the servers. FIG. 3 is a diagram illustrating an example of a software configuration of the devices constituting the coordination system 1000. The programs for realizing the functions of software shown in FIG. 3 are stored in the ROM 203 of each of the devices and the servers. The CPU 202 loads the programs onto the RAM 204 and executes them so as to realize these functions.

Figure 4:
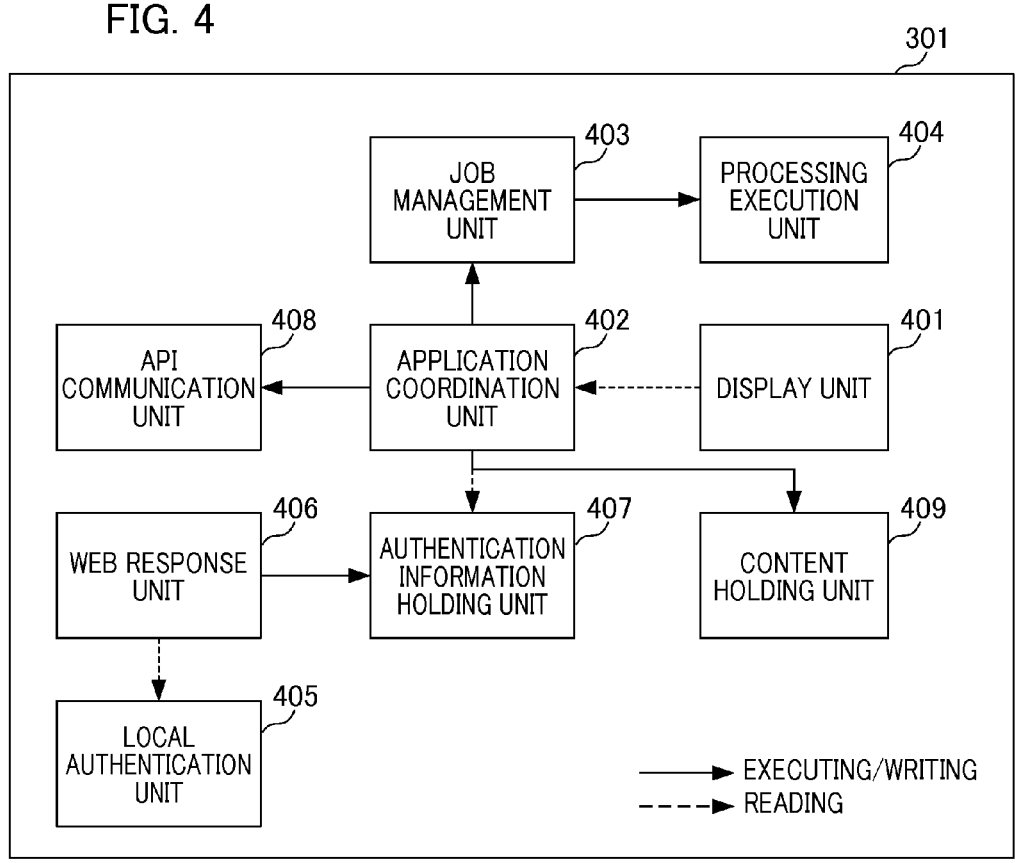
FIG. 4 is a diagram illustrating the functions realized by control software for a coordination device.

Next, a description will be given of the functions of a control software 301 with reference to FIG. 4. A display unit 401 displays various screens. An application coordination unit 402 is an application implementing the function for coordinating with a web application 303. The application coordination unit 402 performs processing for registering, reading, changing, or deleting content on the web application 303 utilizing an API. The application coordination unit 402 holds content to be registered on the web application 303 or content being processed in a content holding unit 409.

A job management unit 403 receives an instruction for calling the function of the coordination device 101 from the application coordination unit 402, and manages the instruction as a job. Also, the job management unit 403 manages a job which is directly ordered from the display unit 401 by a user. For example, when the coordination device 101 is an image forming device, the job management unit 403 manages a print job and a scan job.

A processing execution unit 404 executes a specific function achieved by the coordination device 101. For example, when the coordination device 101 is an image forming device, the processing execution unit 404 executes printing or scanning. When access is made from a web browser 304, a web response unit 406 calls a local authentication unit 405 in order to determine whether or not the user who has accessed is an authorized person. Authentication to be validated by the local authentication unit 405 is authentication within a local network separately from authentication for the web application 303.

In the present embodiment, authentication information used in a local network is referred to as "local authentication information" so as to distinguish it from authentication information for the web application 303. The local authentication unit 405 performs authentication using, for example, form authentication when access is made to the web response unit 406. Form authentication is an authentication method for inputting the user name and password and is a basic method serving as a method used to log in to the coordination device 101. Although the local authentication unit 405 may correspond to other authentication methods, any authentication method may be available in the present invention, and thus, no further description will be given.

When the web response unit 406 acquires a response indicating that the user is an authorized person from the local authentication unit 405, the web response unit 406 responds via web to the web browser 304. Also, the local authentication unit 405 analyzes a URL parameter to thereby acquire authentication information when access is made from the web browser 304. In the present embodiment, authentication information is a user ID and a password or an authentication token pair. The authentication token is information which is capable of receiving all or a part of the services without performing authentication processing for inputting authentication information, such as a user ID, a password, or the like. Also, the web response unit 406 acquires a local user ID from the local authentication unit 405, associates the received authentication information with the local user ID, and saves the resulting authentication information in an authentication information table 900 held by an authentication information holding unit 407.

A detailed description will be given of the authentication information table 900 held by the authentication information holding unit 407 with reference to FIG. 9A. A local user ID 901 is a user ID that is used for authentication in the aforementioned local network. The local user ID may also be an ID which is used upon log-in to the coordination device 101. A service ID 902 is an ID for identifying the web application 303.

Authentication information held by the authentication information holding unit 407 is used for identifying authentication information corresponding to the web application by referring to a user ID 903 and a password 904 or an authentication token 905. The user ID 903 is the user ID of the web application 303. The password 904 is the password of the web application 303. The authentication token 905 is an authentication token which is used for communicating with the web application 303.

In other words, the authentication information holding unit 407 saves correspondence information between the authentication information or the authentication token which is used for authentication of the coordination device 101 by the web application 303 and local authentication information (local user ID) corresponding to a user. The local user ID is used upon local authentication processing performed by a user.

Then, the application coordination unit 402 refers to the correspondence information saved in the authentication information holding unit 407, and passes an authentication request (content acquisition request) including the authentication information or authentication token associated with the local user ID to an API communication unit 408. The API communication unit 408 transmits the received authentication request to web application. In this manner, when a plurality of users receives the provision of web services from web application utilizing a coordination device, the coordination device can receive authentication using the authentication information or authentication token associated with local authentication information about each user. Consequently, occupation of a shared coordination device by a certain user can be avoided.

The API communication unit 408 is called by the application coordination unit 402 and communicates with an API communication unit 602 of the web application 303. In this manner, the application coordination unit 402 performs operations on the content of the web application 303. The content holding unit 409 holds the content acquired from the web application 303 by the API communication unit 408 via the application coordination unit 402.

Figure 5:
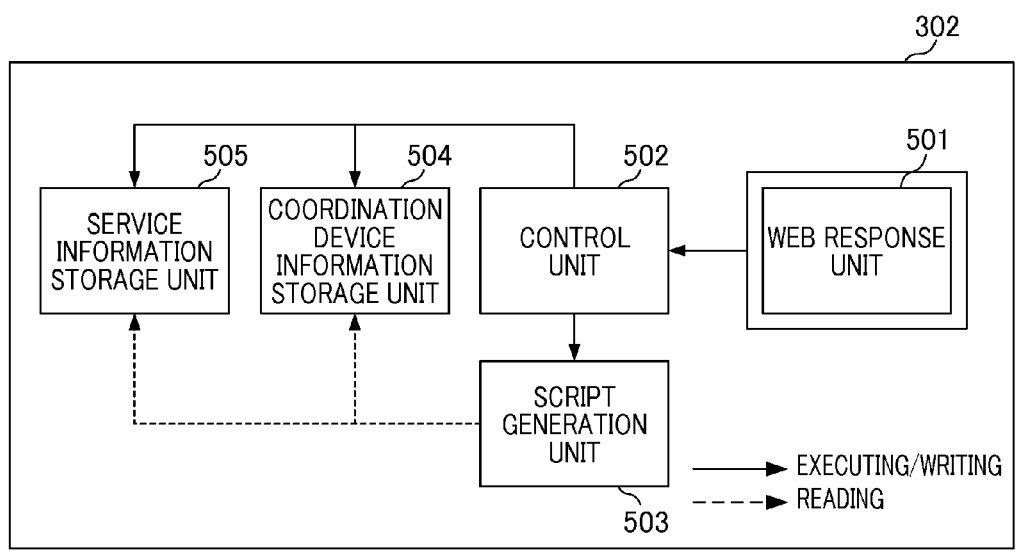
FIG. 5 is a diagram illustrating the functions realized by a mediation service.

FIG. 5 is a diagram illustrating the functions of a mediation service 302. The mediation service 302 is a mediation system that mediates provision of authentication information to be used by the coordination device 101 when the coordination device 101 coordinates with the web application 303. A web response unit 501 of the mediation service 302 responds to the client computer 104 from the web browser 304 via web when accessed by the web browser 304. A control unit 502 calls a script generation unit 503, a coordination device information storage unit 504, or a service information storage unit 505 as a consequence of calling from the web response unit 501.

The coordination device information storage unit 504 holds a coordination device table 920 shown in FIG. 9C. In other words, each of the control unit 502 and the coordination device information storage unit 504 functions as a storage unit that stores coordination information indicating a coordination state between the web application 303 and the coordination device 101. In the coordination device table 920, a device ID 921 is an ID for uniquely specifying the coordination device 101. An IP address 922 is an IP address of the coordination device 101 in a local network. A device name 923 is a name to be displayed by the web browser 304 when a user selects the coordination device 101.

Also, a Service A 924 and a Service B 925 are service IDs and indicate whether or not the coordination device 101 coordinates with the service IDs. In the present embodiment, whether or not the coordination device 101 coordinates with the service IDs is held for each coordination device. However, the mediation service 302 may also hold coordination device information by associating with local authentication information in coordination with local network authentication. Cooperation device information shown in FIG. 9C is just an example, and thus, the mediation service 302 may hold any information such as positional information, model information, or the like about a coordination device.

The service information storage unit 505 holds information regarding the web application 303 as shown in FIG. 9B. A service ID 911 shown in FIG. 9B is an ID for specifying the web application 303. Also, a service name 912 is a display name of the web application 303 and is displayed when a user selects the coordination destination web application 303 using the UI shown in FIG. 8A.

An authentication method 913 is an authentication method defined for each of the web applications 303. In the present embodiment, an OAuth method and a Basic method are employed, but other authentication methods may also be employed. The script generation unit 503 generates a script for responding to the web browser 304 by the web response unit 501. The script generation unit 503 acquires an authentication method for authenticating a service selected by a user in FIG. 8A from the service information storage unit 505, and generates a script in accordance with the authentication method.

FIG. 7A is a diagram illustrating an exemplary script using an OAuth authentication method. The script is a script for redirecting to an OAuth authentication screen provided by the web application 303. Here, callback_url refers to the destination URL to be redirected using the authentication token acquired by OAuth authentication as a URL parameter. In the present embodiment, since the mediation service 302 does not acquire authentication information, the mediation service 302 directly specifies the IP address of the coordination device 101. The script generation unit 503 acquires the IP address by referring to the coordination device information storage unit 504, and embeds the IP address in a script.

FIG. 7B is a diagram illustrating an exemplary script using a Basic authentication method. The script is a script for presenting a dialogue for inputting authentication information for the web application 303 and redirecting the user information and the password input to the dialogue as URL parameters to the cooperation device 101. The redirect destination URL is generated on the basis of the IP address of the coordination device 101. The script generation unit 503 acquires the IP address of the coordination device 101 by referring to the coordination device information storage unit 504.

As shown in the scripts in FIGS. 7A and 7B, the script generation unit 503 generates a script corresponding to an authentication method for each application server. The control unit 502 passes a script corresponding to an authentication method to the web response unit 501. The web response unit 501 transmits the script to the web browser 304. In other words, each of the script generation unit 503 and the web response unit 501 functions as a generation unit that generates a script to be authenticated by an authentication method corresponding to the coordination destination web application and transmits the generated script to the web browser 304.

Figure 6:
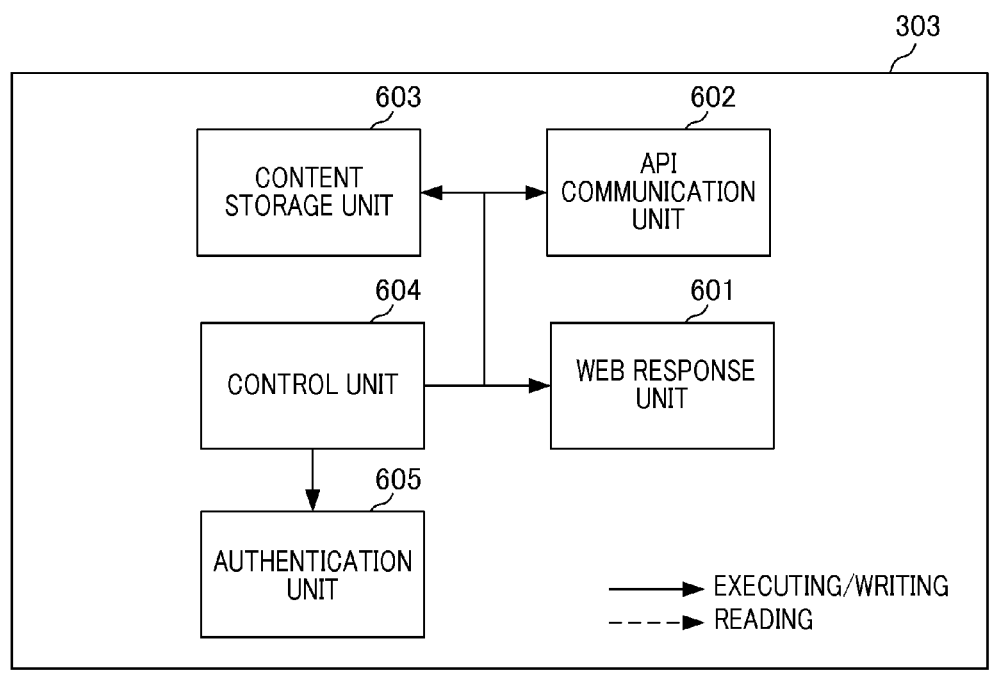
FIG. 6 is a diagram illustrating the functions realized by a web application.

FIG. 6 is a diagram illustrating the functions of the application server 103. The application server 103 is a service providing system that provides a web service in response to a request from a user device. The API communication unit 602 calls a control unit 604 in accordance with a request from the API communication unit 408 of the coordination device 101. More specifically, the coordination application unit 402 of the coordination device 101 makes a content acquisition request to the web application 303 via the API communication unit 408. The content acquisition request is a request for acquiring content data held by the web application 303. In the present embodiment, communication by an API communication unit 602 is an HTTP communication. The API communication unit 408 sets the authentication information or authentication token for a user to the HTTP header of an HTTP communication packet corresponding to the content acquisition request.

When the API communication unit 602 calls the control unit 604, the API communication unit 602 acquires the authentication information or authentication token from the HTTP header, and passes it to the control unit 604. The control unit 604 executes user authentication processing using the authentication information or authentication token received from the API communication unit 602. If authentication is successful as a result of authentication processing, the control unit 604 generates a response including content data corresponding to the content acquisition request, and passes the response to the API communication unit 602. The API communication unit 602 passes the response received from the control unit 604 to the API communication unit 408 of a coordination device 101. In other words, each of the API communication unit 408 and the application coordination unit 402 functions as an authentication unit that receives authentication from the web application 303 using the saved authentication information or authentication token.

A web response unit 601 calls the control unit 604 in accordance with a request from the web browser 304 of the client computer 104. At this time, the web response unit 601 acquires authentication information from the HTTP header and passes it to the control unit 604. Next, the web response unit 601 passes the response generated by the control unit 604.

The control unit 604 calls an authentication unit 605 in order to verify the validity of authentication information. The authentication unit 605 holds an authentication information table 940 shown in FIG. 9E. The authentication information table 940 stores a user ID and password pair for a user(s) registered in the web application 303. When the user ID and password pair is valid, the authentication unit 605 responds to the control unit 604 by indicating the fact that the verification result is acceptable. When the user ID and password pair is invalid, the authentication unit 605 responds to the control unit 604 by indicating the fact that the verification result is not acceptable.

Also, the control unit 604 calls the authentication unit 605 in order to verify the validity of the authentication token. The authentication token is an authentication token to be issued by the authentication unit 605 when an OAuth authentication request is made to the web response unit 601. The authentication unit 605 holds an authentication token table 930 shown in FIG. 9D, and verifies the validity of the authentication token by confirming the fact that the caller application ID matches the authentication token.

When the authentication token is valid, the authentication unit 605 responds to the control unit 604 by indicating the fact that the verification result is acceptable. The API communication unit 602 receives the verification result from the control unit 604, and responds to the API communication unit 408. When the authentication token is invalid, the authentication unit 605 responds to the control unit 604 by indicating the fact that the verification result is not acceptable. The API communication unit 602 receives the verification result from the control unit 604, and responds to the API communication unit 408.

The API communication unit 602 calls the control unit 604. At this time, the control unit 604 receives authentication information from the API communication unit 602. The control unit 604 passes the authentication information to the authentication unit 605, and causes the authentication unit 605 to confirm the validity of the authentication information. When the verification result obtained by the authentication unit 605 is acceptable, the control unit 604 registers, acquires, changes, or deletes the content of a content storage unit 603 in response to the request received from the API communication unit 408 via the API communication unit 602. Next, the control unit 604 passes the result to the API communication unit 602. When the verification result is not acceptable, the control unit 604 passes an error response to the API communication unit 602.

Also, the web response unit 601 calls the control unit 604 in order to operate the content. At this time, the control unit 604 receives authentication information from the web response unit 601. The control unit 604 causes the authentication unit 605 to confirm the validity of the authentication information. When the verification result obtained by the authentication unit 605 is acceptable, the control unit 604 registers, acquires, changes, or deletes the content of the content storage unit 603 in accordance with the operation by a user on the web browser 304, and transmits the operation result to the web response unit 601. When the verification result is not acceptable, the control unit 604 passess an error response indicating that the verification has failed to the web response unit 601, and facilitates reauthentication. Also, the web response unit 601 calls the control unit 604 to cause it to generate a response for OAuth authentication. At this time, the control unit 604 receives authentication information, an application ID, and callback_url from the web response unit 601.

The control unit 604 causes the authentication unit 605 to confirm the validity of the authentication information. When the verification result obtained by the authentication unit 605 is acceptable, the control unit 604 generates an authorization screen 802 shown in FIG. 8B, and passes the authorization screen 802 to the web response unit 601. When an OK button is pressed on the authorization screen 802 on the web browser 304 of the client computer 104, the web response unit 601 calls the control unit 604 again. Next, the authentication unit 605 receives an instruction from the control unit 604, generates an authentication token in response to the authentication information and application ID, and passes a response for redirecting the authentication token as a URL parameter to callback_url to the web response unit 601. At this time, the authentication unit 605 associates the generated authentication token with the application ID, and saves the resulting authentication information in the authentication token table 930.

When a Cancel button is pressed by a user on the authorization screen 802, the control unit 604 generates a screen (not shown) indicating that the transaction has been cancelled, and passes the generated screen to the web response unit 601. Also, when the verification result is not acceptable, the control unit 604 passes a screen (not shown) indicating that the verification has failed to the web response unit 601, and facilitates reauthentication.

Figure 10:
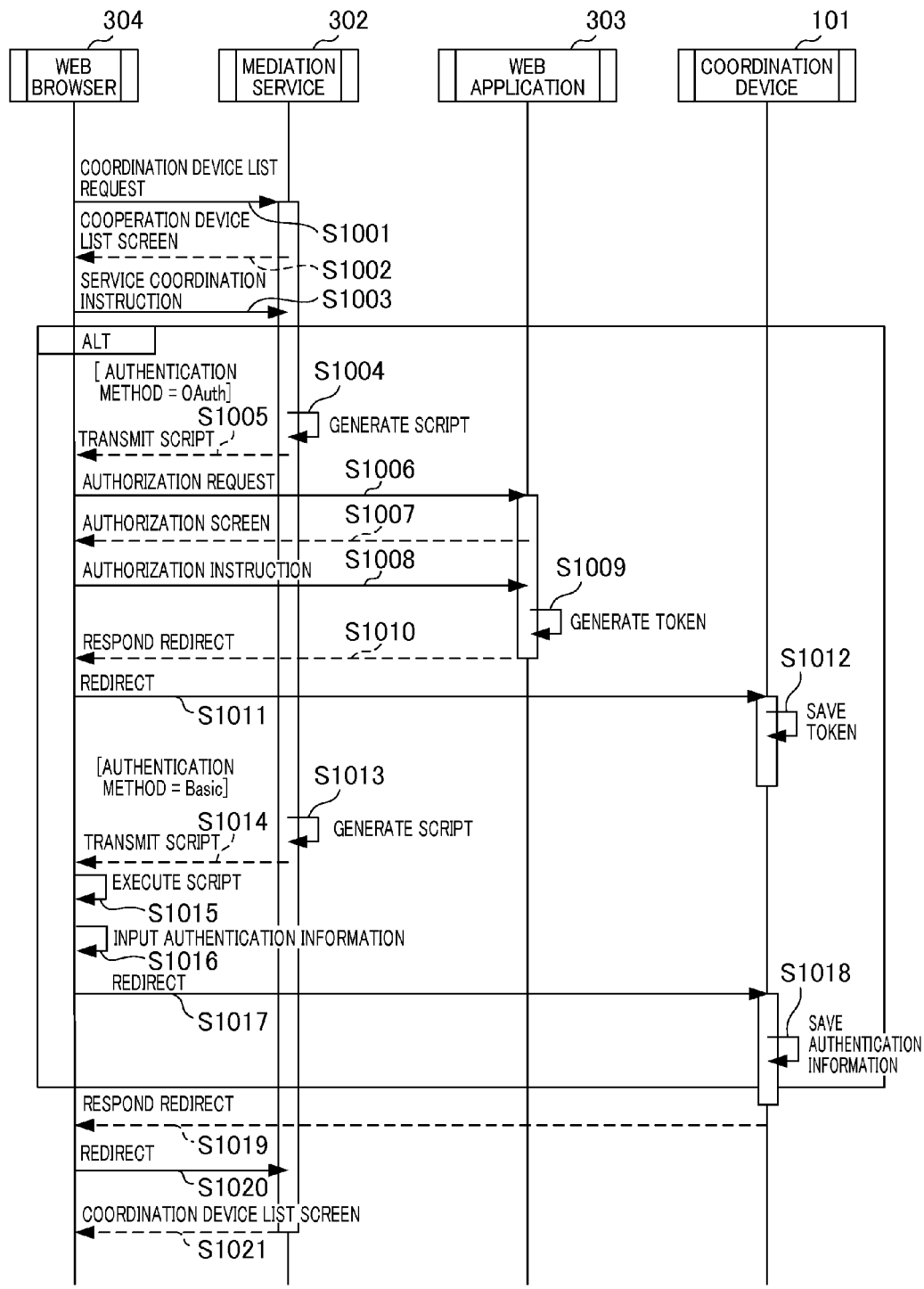
FIG. 10 is a sequence diagram illustrating processing for saving authentication information of a web application on a coordination device via a mediation service.

Next, a description will be given of processing for registering authentication information in the coordination device 101 by accessing the mediation service 302 by the web browser 304 with reference to FIG. 10.

Firstly, it is assumed that the device ID, the IP address, and the device name of the coordination device 101 are pre-registered in the mediation service 302. The registration may be automatically made by the coordination device 101 or may be manually made by user using a web browser.

In step S1001, the web browser 304 requests a coordination device list to the web response unit 501 of the mediation service 302. The web browser 304 requests the coordination device list as a coordination instruction input screen. The web response unit 501 calls the control unit 502. The called control unit 502 generates a coordination device list screen. The control unit 502 refers to the coordination device table 920 stored in the coordination device information storage unit 504 to thereby generate a coordination device list screen. The screen to be generated by the control unit 502 and displayed by the web browser 304 is, for example, a screen shown in FIG. 8A. In the coordination device list screen shown in FIG. 8A, a user can confirm the list of coordination devices, and provide a coordination instruction for coordinating the coordination device(s) with the web application.

In step S1002, the web response unit 501 of the mediation service 302 passes the coordination device list screen generated by the control unit 502 in step S1001 to the web browser 304 as a response to the coordination device list request. In other words, the web browser 304 receives data provided by the coordination device 101 via the web application 303 and displays an instruction unit (FIG. 8A) configured to start a service through which image processing is subjected to the received data.

In step S1003, when a user presses a coordination button 805 shown in FIG. 8A on the web browser 304, the web browser 304 provides a service coordination instruction to the web response unit 501 of the mediation service 302. At this time, a coordination instruction is provided to a service corresponding to the pressed coordination button. Note that the control unit 502 branches processing to step S1004 when the authentication method for authenticating a web application corresponding to the pressed button is the OAuth authentication method or branches processing to step S1013 when the authentication method is the Basic authentication method. In other words, the web browser 304 functions as an access unit that accesses an address for receiving an authentication service in response to the fact that the start of the service to which image processing is subjected by the coordination device 101 has been ordered.

When a user presses a coordination button for a device B to be in coordination with a service B in step S1003, the process advances to step S1004. In step S1004, the web response unit 501 of the mediation service 302 receives a coordination instruction. In other words, the web response unit 501 functions as an acceptance unit that accepts a coordination instruction for coordinating the web application 303 with the coordination device 101 via a network. The web response unit 501 calls the control unit 502 as a consequence of accepting the coordination instruction. The control unit 502 calls the coordination device information storage unit 504, and refers to information regarding the web application 303 shown in FIG. 9B. When the authentication method corresponding to the web application 303 is the OAuth authentication method, the control unit 502 calls the script generation unit 503.

In step S1004, the script generation unit 503 of the mediation service 302 generates a script for the OAuth authentication method and passes the script to the control unit 502. The control unit 502 passes the generated script to the web response unit 501. In the present embodiment, the script generation unit 503 generates, for example, a script shown in FIG. 7A. At this time, the script generation unit 503 generates a script for specifying the IP address of the coordination device 101 as callback_url, and thus, the web browser 304 can transmit a redirect instruction with an authentication token to the coordination device 101. In step S1005, the web response unit 501 transmits the script received from the control unit 502 to the web browser 304 as a response.

In step S1006, the web browser 304 executes the script. In the present embodiment, the web browser 304 is pre-configured to immediately execute the script upon receipt thereof. Executing a script immediately on the web browser 304 side is a known technology for a person skilled in the art. The web browser 304 executes the script shown in FIG. 7A, and makes an authorization request to the web response unit 601 of the web application 303.

When the web response unit 601 of the web application 303 receives the authorization request from the web browser 304 in step S1007, the web response unit 601 calls the control unit 604. The control unit 604 causes the authentication unit 605 to confirm the validity of the authorization request. In other words, the control unit 604 confirms whether or not the web browser 304 has logged in the web application 303. When the web browser 304 has logged in the web application 303, the authentication unit 605 determines that the verification result is acceptable, generates the screen shown in FIG. 8B (in the present embodiment, referred to as "the authorization screen 802"), and passes the screen to the web response unit 601.

Also, when the authentication unit 605 determines that the verification result is not acceptable, the control unit 604 passes a screen indicating that the verification has failed to the web response unit 601, and facilitates reauthorization. When reauthorization is performed for a user who has not logged in, the user inputs his/her user ID and password on a reauthorization screen (not shown) to thereby perform reauthorization. Next, the web response unit 601 of the web application 303 transmits the authorization screen 802 to the web browser 304.

In step S1008, the authorization screen 802 shown in FIG. 8B is displayed on the web browser 304. In the present embodiment, the authorization screen 802 is also referred to as an "authentication information input screen". When a user presses the OK button on the authorization screen 802, the web browser 304 provides an authorization instruction to the web response unit 601 of the web application 303. When a user presses the Cancel button, token issuance processing in step S1009 is not performed. In other words, the web browser 304 functions as a transmission unit that transmits authentication information, which is input via an authentication screen provided by accessing an address for receiving an authentication service, to the web application.

In step S1009, the web response unit 601 of the web application 303 receives the authorization instruction from the web browser 304. The web response unit 601 which has received the authorization instruction calls the control unit 604. The control unit 604 is called from the web response unit 601 for generating a response for OAuth authentication. At this time, the control unit 604 receives authentication information, an application ID, and callback_url from the web response unit 601. Next, the control unit 604 generates an authentication token corresponding to authentication information and the application ID, and responds to the web response unit 601 with a redirect instruction to callback_url using the generated authentication token as the URL parameter.

For example, as shown in FIG. 7A, the web response unit 601 provides a redirect instruction using the authentication token in the form of "http://192.168.0.2?AuthToken=1d04otkbmrldohnn" as the URL parameter. At this time, the authentication unit 605 saves the generated authentication token associated with the application ID in the authentication token table 930.

In step S1010, the web response unit 601 of the web application 303 passes a response for redirecting the authentication token generated in step S1009 to the coordination device 101 to the web browser 304.

In step S1011, the web browser 304 transmits the authentication token to the web response unit 406 of the coordination device 101 in accordance with the redirect instruction in step S1010.

In step S1012, the web response unit 406 of the coordination device 101 calls the local authentication unit 405. When the local authentication unit 405 has determined that the user is an authorized person, the web response unit 406 performs the following processing and then responds via web. The web response unit 406 of the coordination device 101 analyzes the URL parameter and acquires the authentication token as authentication information. Also, the web response unit 406 acquires a local user ID from the local authentication unit 405, associates the received authentication token with the local user ID and service ID, and saves the resulting authentication token in the authentication information table 900 held by the authentication information holding unit 407.

When a plurality of users uses the coordination device 101, the authentication token saved by a certain user must prevent from being used by another user. With this system structure, the authentication token can be managed by associating it with the local user ID and the service ID, resulting in improved usability.

In the present embodiment, a description has been given for a case where authentication is performed in a local network. However, when only one user uses the coordination device 101, there is no need for authentication in a local network, and thus, his/her authentication token may not be saved in association with local authentication information.

When a user presses the coordination button for the device B to be in coordination with a service A on the screen shown in FIG. 8A, the Basic authentication method is used. In step S1013, the script generation unit 503 of the mediation service 302 generates a script for the Basic authentication method and passes the generated script to the control unit 502. The control unit 502 passes the received script to the web response unit 501. In the present embodiment, the script generation unit 503 generates, for example, a script as shown in FIG. 7B. The script generation unit 503 specifies the IP address of the coordination device 101 as the redirect destination URL, and thus, the web browser 304 can transmit the user ID and the password of the web application 303 to the coordination device 101.

In step S1014, the web browser 304 receives the script generated by the script generation unit 503. In step S1015, the web browser 304 executes the script. As described above, in general, the web browser 304 immediately executes the script upon receipt thereof. The web browser 304 displays an authentication information input screen 803 shown in FIG. 8C as a result of execution of the script shown in FIG. 7B.

The web browser 304 displays the authorization screen 802 shown in FIG. 8B or the authentication information input screen 803 shown in FIG. 8C by executing the script. In other words, the web browser 304 functions as a display unit that displays an authentication information input screen corresponding to the web application 303 of the coordination destination by executing the script.

In step S1016, a user inputs his/her user ID and password on the authentication information input screen 803. In step S1017, when a user presses an OK button shown in the authentication information input screen 803, the web browser 304 transmits a redirect instruction for redirecting to the web response unit 406 of the coordination device 101 using the user ID and password as the URL parameters.

When the user presses the OK button on the authorization screen 802 as described above, the web browser 304 transmits the authentication token to the web response unit 406. Also, when the user presses the OK button on the authentication information input screen 803, the web browser 304 transmits his/her user ID and password to the web response unit 406. In other words, the web browser 304 functions as a transmission unit that transmits an authentication token issued by the web application 303 in response to input information input on the authentication information input screen or authentication information input on the authentication information input screen.

In step S1018, the web response unit 406 of the coordination device 101 calls the local authentication unit 405. When the local authentication unit 405 has determined that the user is an authorized person, the web response unit 406 performs the following processing and then responds via web. The web response unit 406 of the coordination device 101 analyzes the URL parameter and acquires a user ID and password pair as authentication information. Also, the web response unit 406 acquires a local user ID from the local authentication unit 405, associates the received user ID and password pair with the local user ID and service ID, and saves the resulting user ID and password pair in the authentication information table 900 held by the authentication information holding unit 407. In the present embodiment, a description has been given for a case where authentication is performed in a local network. However, when only one user uses the coordination device 101, there is no need for authentication in a local network, and thus, his/her user ID and password may not be saved in association with local authentication information.

In step S1019, the web response unit 406 of the coordination device 101 provides a redirect instruction for redirecting to the mediation service 302 to the web browser 304. The redirect instruction includes coordination information indicating that an authentication token or a user ID and password pair has already established coordination with a service with which coordination is to be established. The coordination information may directly notify the mediation service 302 of a service to be coordinated from the coordination device 101. In other words, the web response unit 406 functions as a notification unit that provides notification about information indicating that the coordination device 101 has already established coordination with the web application 303.

In step S1020, the web browser 304 redirects authentication information to the web response unit 501 of the mediation service 302 in accordance with the redirect instruction in step S1019.

In step S1021, the web response unit 501 of the mediation service 302 calls the control unit 502. As described above, the web response unit 501 includes coordination information indicating that the coordination device 101 has already established coordination with the web application 303. The control unit 502 generates a coordination device list screen 804 shown in FIG. 8D based on the coordination information. At this time, In the cooperation device list screen 804, information that coordination has been established between services for which authentication information is registered with the aid of the flow described in the present embodiment is displayed. In other words, the control unit 502 functions as a display unit that generates a coordination instruction input screen and causes the web application 303 to display the screen. The web response unit 501 transmits the coordination device list screen 804 generated by the control unit 502 to the web browser 304.

As described above, in the first embodiment, the coordination device 101 can acquire authentication information for the web application 303 without acquiring authentication information for the web application 303 by the mediation service 302. Thus, the leaking of authentication information from the mediation server can be prevented, which eliminates the possibility of wire tapping of authentication information in a communication path between the mediation server and the external device. Also, according to the information processing system of the first embodiment, an image processing device which coordinates with a service providing server can acquire authentication information without inputting authentication information directly to the image processing device by a user. Thus, the time and labor for a user to input authentication information directly to the image processing device may be saved.

Subsequently, the coordination device 101 makes an authentication request to the web application 303 on the basis of the authentication information. If authentication is successful, the coordination device 101 can acquire content data or the like. The coordination system of the present embodiment eliminates the need for a user to directly input authentication information via the display unit 401 on the coordination device 101, resulting in providing a convenience for a user. Also, the mediation service 302 does not acquire authentication information for the web application 303, and thus, the authentication information can be prevented from being leaked. Furthermore, occupation of a shared coordination device by a user can be avoided.

In the first embodiment, the mediation service 302 causes the web browser 304 to display the coordination state between the coordination device 101 and the web application 303 on a coordination instruction screen 801 by referring to a coordination device information table 920. However, when authentication information is input by the display unit 401 of the coordination device 101 by a user, the mediation service 302 cannot know the fact that coordination has been established between the coordination device 101 and the web application 303.

Figure 12:
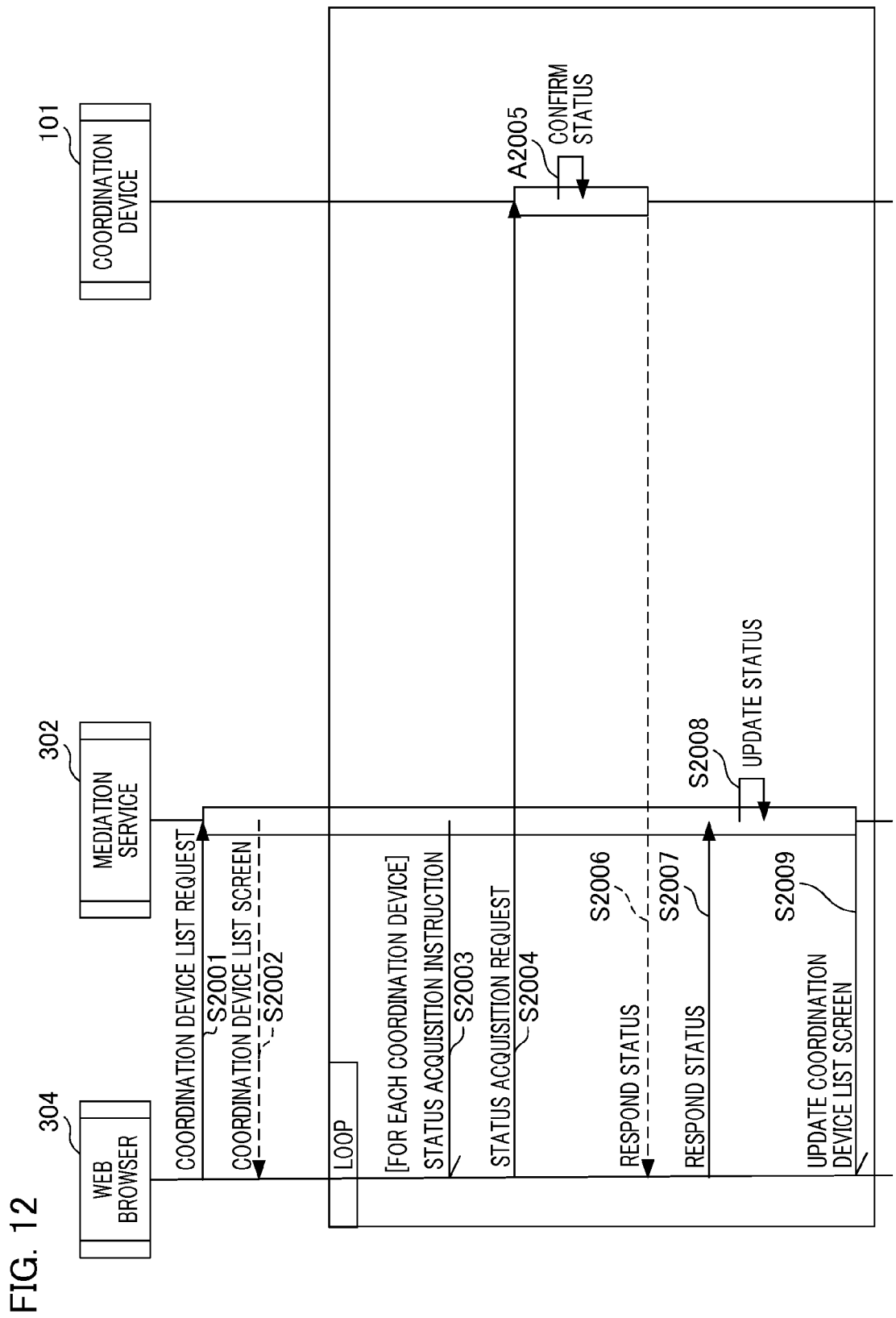
FIG. 12 is a sequence diagram illustrating processing for acquiring a coordination state between a cooperation device and a web application by the mediation service via a web browser.

Next, a description will be given of a second embodiment with reference to FIG. 12. Processing to be described in the second embodiment is processing for updating a coordination state. In step S2001, the web browser 304 requests a coordination device list to the web response unit 501 of the mediation service 302. The web response unit 501 calls the control unit 502 and the control unit 502 generates a coordination device list screen. The control unit 502 refers to the coordination device table 920 stored in the coordination device information storage unit 504 to thereby generate a coordination device list screen. A screen to be generated at this time is, for example, a screen as shown in FIG. 8A. In the coordination device list screen shown in FIG. 8A, a user can confirm the list of coordination devices, and provide a coordination instruction for coordinating the coordination device(s) with the web application.

In step S2002, the web response unit 501 of the mediation service 302 responds to the web browser 304 with the coordination device list screen generated in step S2001.

In step S2003, the web response unit 501 of the mediation service 302 provides a status acquisition instruction to the web browser 304 in the asynchronous communication mode. In other words, the web response unit 501 functions as a state request unit that makes an acquisition request for the coordination state between the coordination device 101 and the web application 303 to the coordination device 101. The status acquisition instruction in step 2003 is provided by asynchronously calling an XML Http Request using AJAX. The term "AJAX" refers to a technology in which the displayed HTML can be dynamically rewritten with the aid of an asynchronous communication using a web browser.

In step S2004, the web browser 304 makes a status acquisition request to the coordination device 101 in accordance with the status acquisition instruction in step S2003. At this time, a status acquisition request is made in the form of, for example, "http://192.168.0.2?ResponseServiceStatus=ServiceA". The term "ResponseServiceStatus" refers to a web application of which the status is confirmed.

In step S2005, the web response unit 406 of the coordination device 101 refers to the authentication information table 900 held by the authentication information holding unit 407, and acquires the coordination state with the web application 303 specified in step S2004.

In step S2006, the web response unit 406 of the coordination device 101 informs the web browser 304 of the coordination state acquired in step S2005. While, in the present embodiment, the web application 303 is specified in step S2004, the web response unit 406 may also inform the web browser 304 of all coordination states between the coordination devices 101 and the web application 303 without specifying the web application 303. Furthermore, when the mediation service 302 is authenticated and coordinates with the coordination device 101, the coordination device 101 saves authentication information for the web application 303 by associating it with local authentication information as described in the first embodiment. In the case of foregoing, the coordination device 101 acquires a user's coordination state by referring to the authentication information holding unit 407, and informs the web browser 304 of the state.

Note that the coordination device 101 may also use a refresh token so as to make an authentication token reacquisition request at regular intervals. In this case, the application coordination unit 402 of the coordination device 101 manages the authentication information holding unit 407. Then, after the elapse of a predetermined time, the application coordination unit 402 calls the API communication unit 408 in order to update a preset set time. Also, the application coordination unit 402 sets a refresh token to an authentication token reacquisition request.

Subsequently, the API communication unit 408 transmits the authentication token reacquisition request to the web application 303. When the web application 303 receives a refresh token included in the authentication token reacquisition request, the web application 303 newly issues an authentication token having the same value as the refresh token value and transmits the authentication token to the coordination device 101. With the aid of the aforementioned system structure, the authentication token can be prevented from expiring by making an authentication token reacquisition request at regular intervals.

Also, assume that a refresh token held by the authentication information holding unit 407 is expired upon confirmation of status. In this case, the application coordination unit 402 of the coordination device 101 calls the API communication unit 408 and transmits an authorization screen to the web browser 304. When a user presses an authorization button on the web browser 304, the authentication unit 605 of the web application 303 newly issues an authentication token. In other words, the application coordination unit 402 functions as a token request unit that requests reacquisition of an authentication token at regular intervals and makes an authentication token reissuance request to the web application 303 when the authentication token is invalid.

In step S2007, the web browser 304 transmits a status response to the mediation service 302. In step S2008, the mediation service 302 updates the coordination device information storage unit 504 in accordance with the status received in step S2007. In step S2009, the mediation service 302 updates the coordination device list screen in the asynchronous communication mode in accordance with the status received in step S2008.

As described above, according to the second embodiment, when a coordination device list screen 801 of the mediation service 302 is displayed on the web browser 304 by a user, the mediation service 302 correctly reflects the coordination state so that the coordination device list screen 801 can display the current coordination state.

In the first embodiment, the mediation service 302 has the script generation unit 503 and responds to the web browser 304. In the third embodiment, a description will be given of the configuration in which the coordination device 101 has a script generation unit 410 and the web response unit 501 of the mediation service 302 only redirects to the web response unit 406 of the coordination device.

Figure 11B:
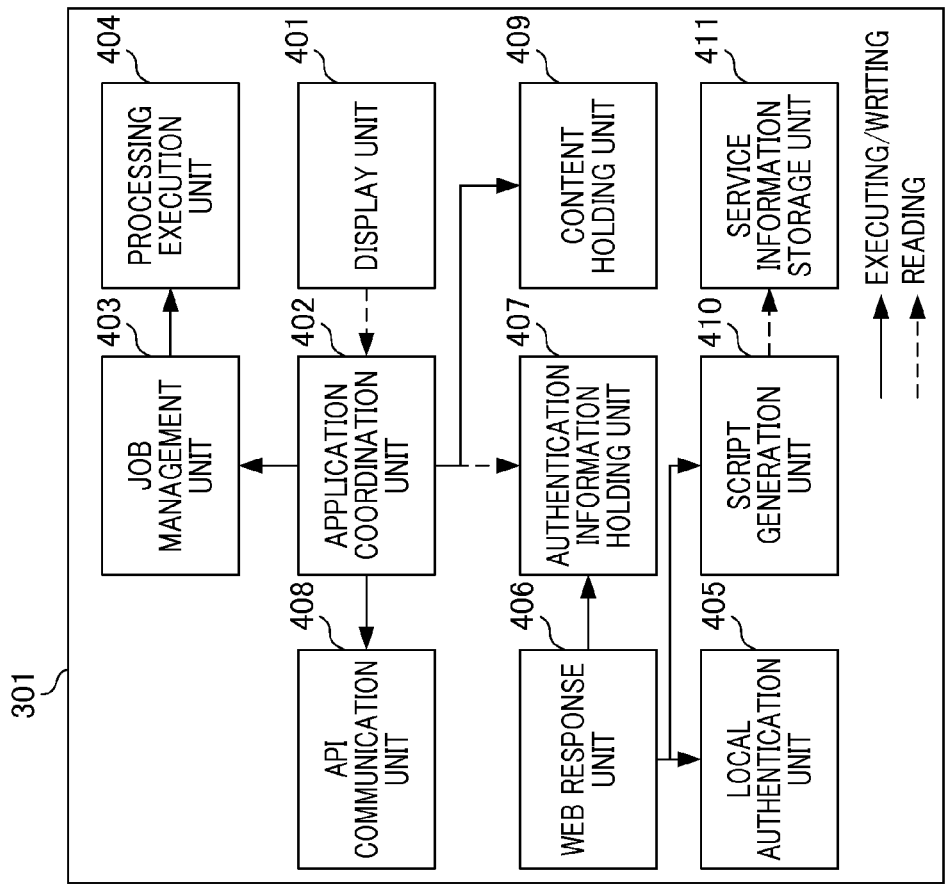
FIG. 11B is a diagram illustrating the software configuration of a coordination device according to the third embodiment.
Figure 11A:
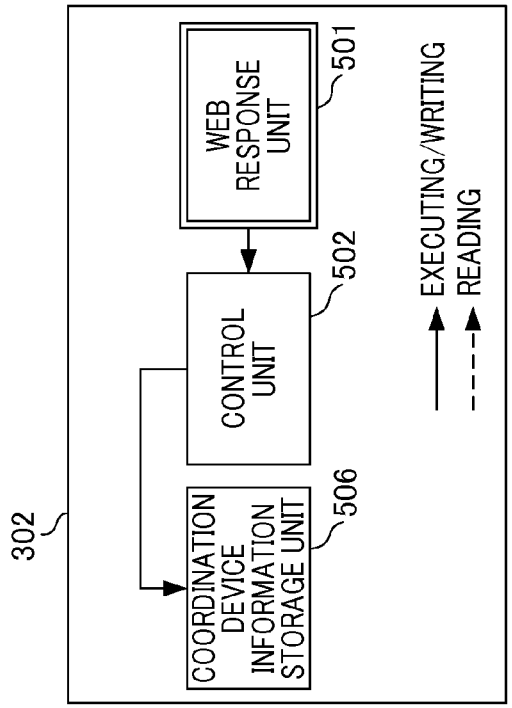
FIG. 11A is a diagram illustrating the software configuration of a mediation service according to a third embodiment.

FIGS. 11A and 11B are diagrams illustrating the software configuration of the mediation server 102 and the coordination device 101, respectively, according to the third embodiment. As shown in FIG. 11A, the software configuration of the mediation service 302 is the same as that of the first embodiment shown in FIG. 5 except that the script generation unit 503 and the service information storage unit 505 are removed. The software configuration of the script generation unit 503 and the service information storage unit 505 is embedded into the software configuration of the coordination device 102 shown in FIG. 11B. The script generation unit 410 and a service information storage unit 411 provide the same functions as those of the script generation unit 503 and the service information storage unit 505 in the software configuration of the mediation service 302 described in the first embodiment. In other words, in the present embodiment, the script generation unit 410 functions as a generation unit that generates a script to be authenticated by an authentication method corresponding to the web application 303. Also, the service information storage unit 505 functions as a saving unit that saves authentication information or an authentication token.

Figure 13:
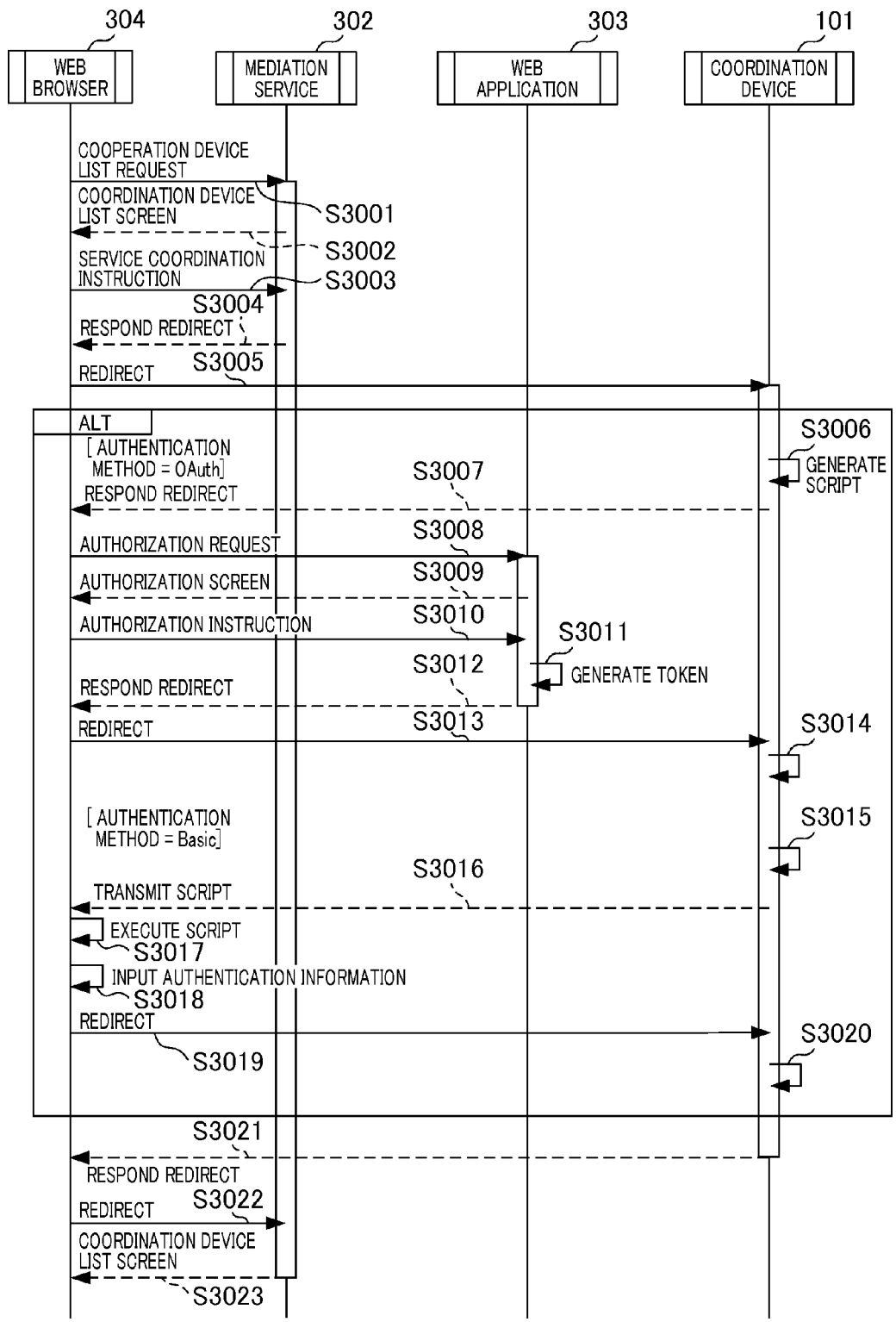
FIG. 13 is a sequence diagram illustrating processing for saving authentication information of a web application on a coordination device by a web browser utilizing a mediation service.

Hereinafter, a description will be given of a processing flow in the present embodiment with reference to FIG. 13. Since the processes in step S3001 to step S3003 are the same as those in step S1001 to step S1003 of the first embodiment, no description will be given here. In step S3004, the web response unit 501 of the mediation service 302 makes a redirect response for the web response unit 406 of the coordination device 101 to the web browser 304. In other words, the web response unit 501 also functions as a transfer unit that transfers the coordination instruction accepted in step S3003 to the coordination device 101.

In step S3005, the web browser 304 accesses the coordination device 101 in accordance with the redirect response in step S3004. At this time, the service ID of the web application 303 is added to the URL of the redirect response. For example, the service ID is added in the form of "http://192.168.0.2?ServiceID=ServiceA". Also, the web response unit 406 of the coordination device 101 calls the script generation unit 410. The script generation unit 410 calls the service information storage unit and determines the authentication method for the web application 303 from the service ID. When the authentication method is the OAuth authentication method as a result of determination, the process branches to step S3006, whereas when the authentication method is the Basic authentication method, the process branches to step S3015. While, in the present embodiment, a description will be given of a processing flow for two types of authentication methods, other authentication methods may also be supported.

In step S3006, the script generation unit 410 of the coordination device 101 generates a script for the OAuth authentication and passes the script to the web response unit 406.

In step S3007, the web response unit 406 of the coordination device 101 transmits the script received from the script generation unit 410 to the web browser 304. Here, since the received script is intended to be redirected, a redirect response may be made using HTTP instead of causing the web browser 304 to execute in response to the script. Since the processes in step S3008 to step S3014 are the same as those in step S1006 to step S1012 of the first embodiment, no description will be given here.

Next, in step S3015, the script generation unit 410 of the coordination device 101 generates a script for the Basic authentication and passes the script to the web response unit 406. As in the first embodiment, each of the web response unit 406 and the script generation unit 410 functions as a generation unit that generates a script to be authenticated by an authentication method corresponding to the web application 303 and transmits the generated script to the web browser 304. Since the processes in step S3016 to step S3023 are the same as those in step S1014 to step S1021 of the first embodiment, no description will be given here.

As described above, in the third embodiment, the mediation service only performs redirect processing and the coordination device 101 generates a script for authentication. In the aforementioned configuration in the third embodiment, the same effects as those in the first embodiment may be provided. In addition, the mediation service 302 does not have a function for generating the script, and thus, a processing load on the mediation service 302 can be reduced.

In the third embodiment, a user provides a service coordination instruction on the coordination device list screen of the mediation service 302 so as to redirect to the coordination device 101. In the fourth embodiment, a description will be given of the case where there is no mediation service 302 and authentication coordination is established by accessing the coordination device 101 directly from the web browser 304.

Figure 15:
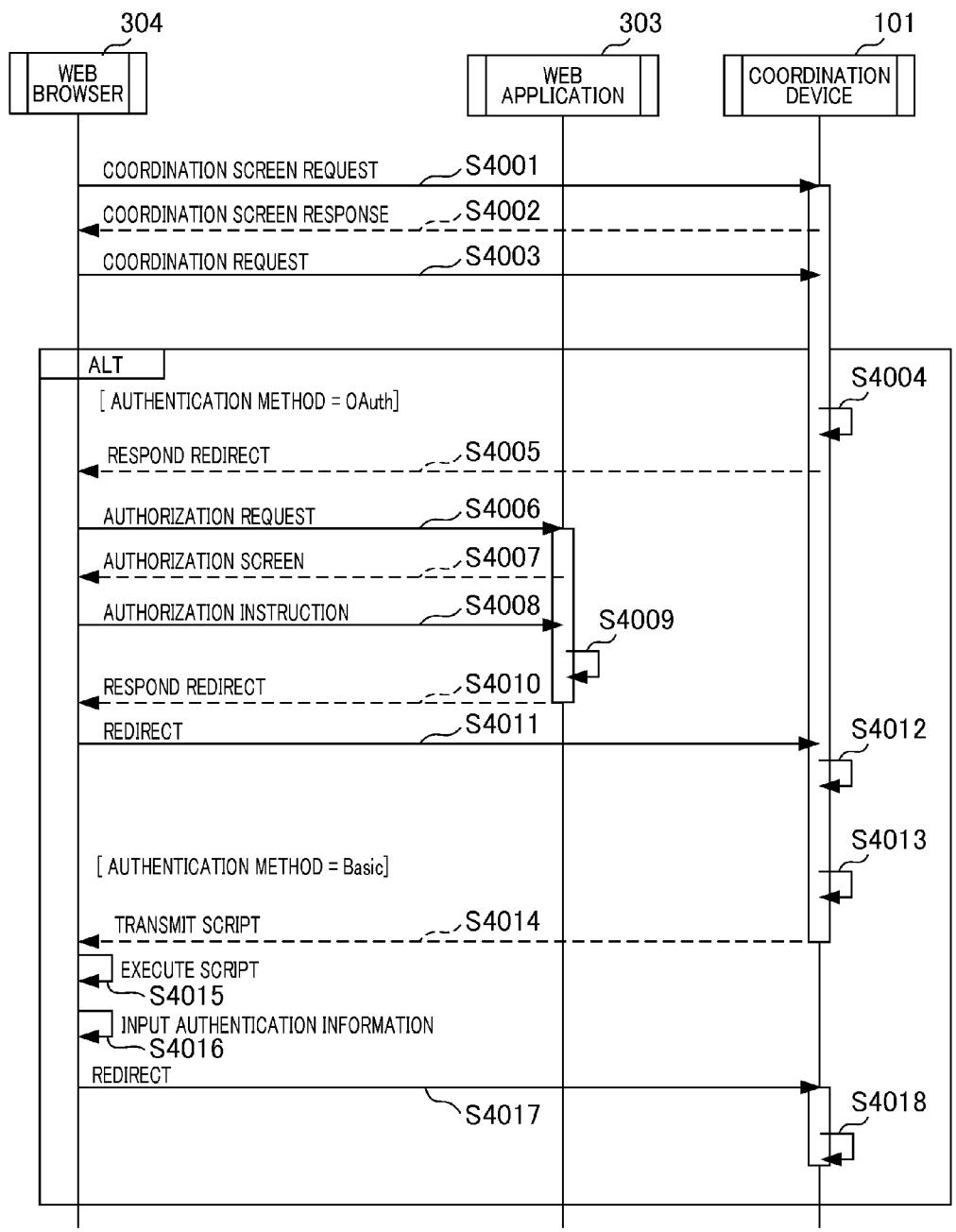
FIG. 15 is a sequence diagram illustrating processing for saving authentication information of a web application on a coordination device by accessing the coordination device directly from a web browser.

The software configuration of the coordination device 101 in the fourth embodiment is the same as that in the third embodiment and there is no mediation service 302 in the present embodiment. Hereinafter, a description will be given of a processing flow in the fourth embodiment with reference to FIG. 15.

Figure 14:
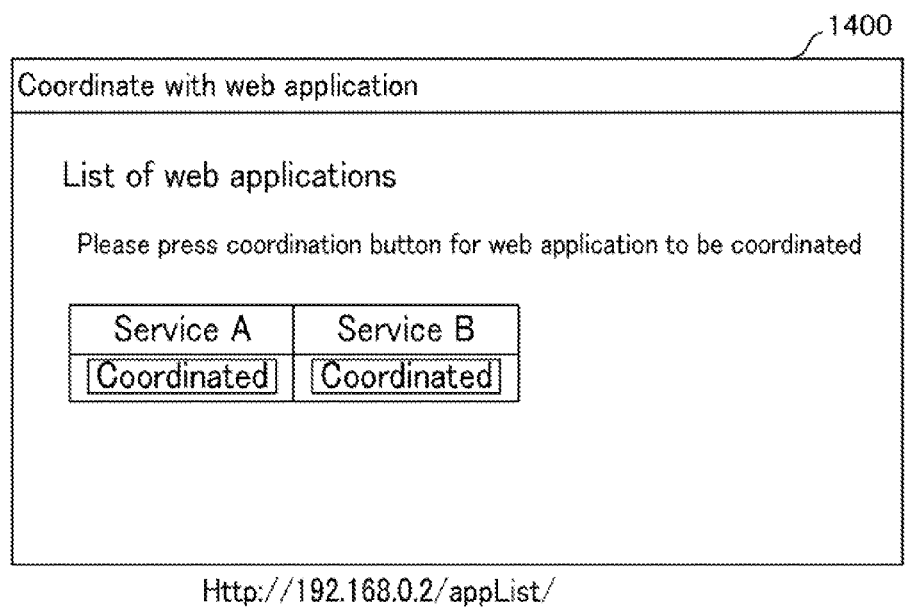
FIG. 14 is a diagram illustrating a web application list screen displayed by a coordination device.

In step S4001, a user makes a coordination screen request by specifying the IP address or the host name of the coordination device 101 using the web browser 304. In step S4002, the web response unit 406 of the coordination device 101 responds to the web browser 304 with a web application list screen 1400 shown in FIG. 14.

In step S4003, a user presses a coordination button on the web application list screen 1400 on the web browser 304. In this manner, the web response unit 406 of the coordination device 101 accepts a coordination request. In other words, in the fourth embodiment, the web response unit 406 functions as an acceptance unit that accepts a coordination instruction for establishing coordination between the web application 303 and the coordination device from the web browser 304. Since the processes in step S4004 to step S4018 are the same as those in step S1004 to step S1018 of the first embodiment, no description will be given here.

As described above, in the fourth embodiment, a user directly accesses the coordination device 101 using the web browser 304 to thereby establish authentication coordination. In the aforementioned configuration in the fourth embodiment, the mediation service 302 is not required. In the configuration in the fourth embodiment, a user can readily register authentication information for the web application 303 in the coordination device 101 with the aid of only the functions provided by the coordination device 101.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-226746 filed Oct. 14, 2011, which is hereby incorporated by reference herein in its entirety.

What is claimed is:

1. An information processing system comprising:
a plurality of service providing systems that provide respective web services in response to a request from a user device;
an image processing device that executes image processing utilizing the web service in coordination with the plurality of service providing systems; and
a mediation system that mediates provision of authentication information to be used by the image processing device when the image processing device coordinates with the plurality of service providing systems,
wherein the mediation system comprises a memory and a processor configured to implement:
an acceptance unit configured to accept a coordination instruction, from the user device, for coordinating a service providing system among the plurality of service providing systems with the image processing device;
a storage unit configured to store coordination information indicating a coordination state between at least the service providing system and the image processing device;
a state request unit configured to make an acquisition request for the coordination state between the image processing device and the service providing system to the image processing device via the user device;
a generation unit configured to generate a script for causing the user device to authenticate in an authentication method to which the service providing system serving as a coordination destination corresponds when the coordination instruction is accepted and transmit the generated script to the user device,
wherein the storage unit updates the coordination information stored in the storage unit based on the coordination state transmitted from the image processing device via the user device in response to the acquisition request for the coordination state,
wherein the user device comprises a memory and a processor configured to implement:
a display unit configured to display an authentication information input screen corresponding to the service providing system specified by executing the script transmitted from the mediation system,
wherein authentication information input screens are presented for respective service providing systems of the plurality of service providing systems; and
a transmission unit configured to transmit authentication information input on the authentication information input screen or an authentication token issued by the service providing system based on the input of authentication information on the authentication information input screen to an image processing device specified by the script, and wherein the image processing device comprises a memory and a processor configured to implement:

a saving unit configured to receive the authentication information or the authentication token from a transmission unit provided in the user device and save the authentication information or the authentication token; and an authentication unit configured to receive authentication from the service providing system using the saved authentication information or authentication token.

2. The information processing system according to claim 1, wherein the memory and the processor of the image processing device are further configured to implement a notification unit configured to directly notify the mediation system of information indicating that the image processing device coordinates with the service providing system or notify the mediation system of the information via the user device in response to the fact that the saving unit has already saved the authentication information or the authentication token, and wherein the memory and the processor of the mediation system are further configured to implement a display unit configured to generate a coordination instruction input screen based on coordination information stored in the storage unit in response to a transmission request of the coordination instruction input screen from the user device and cause the user device to display the generated coordination instruction input screen.

3. The information processing system according to claim 1, wherein the saving unit saves correspondence information between the authentication information or the authentication token which is used for authentication of the image processing device by the service providing system and local authentication information corresponding to a user, and wherein the authentication unit refers to the correspondence information saved in the saving unit, and makes an authentication request, which includes the authentication information or the authentication token associated with the local authentication information used upon local authentication processing for the user, to the service providing system.

4. The information processing system according to claim 1, wherein the memory and the processor of the image processing device are further configured to implement a token request unit configured to request the service providing system to reacquire the authentication token at regular intervals when the saving unit saves the authentication token or to request the service providing system to reissue an authentication token when the authentication token is invalid.

5. An image processing device that executes image processing utilizing a web service in coordination with a plurality of service providing systems which provide the respective web service in response to a request from a user device, the image processing device comprising a memory and a processor configured to implement:

an acceptance unit configured to accept a coordination instruction, from the user device, for coordinating a service providing system among the plurality of service providing systems with the image processing device;

a communication unit configured to receive an acquisition request for a coordination state between the image processing device and the service providing system via the user device, and transmit the coordination state to a mediation system via the user device in response to the acquisition request for the coordination state, wherein the mediation system includes a storage unit which updates coordination information stored in the storage unit based on the transmitted coordination state;

a generation unit configured to generate a script for causing the user device to authenticate in an authentication method to which the service providing system serving as a coordination destination corresponds when the coordination instruction is accepted and transmit the generated script to a coordination destination service providing system indicated by the coordination instruction;

a storage unit configured to receive authentication information input on an authentication information input screen, which is displayed by executing the script, corresponding to the coordination destination service providing system or an authentication token issued by the service providing system depending on the input of authentication information on the authentication information input screen from the user device via a network and save the authentication information or the authentication token, wherein authentication information input screens are presented for respective service providing systems of the plurality of service providing systems; and an authentication unit configured to receive authentication from the service providing system using the saved authentication information or authentication token.

6. A method for controlling an information processing system comprising:

a plurality of service providing systems that provide respective web services in response to a request from a user device;

an image processing device that executes image processing utilizing the web service in coordination with the plurality of service providing systems; and a mediation system that mediates provision of authentication information to be used by the image processing device when the image processing device coordinates with the plurality of service providing systems, wherein the method comprises:

accepting by the mediation system, a coordination instruction, from the user device, for coordinating a service providing system among the plurality of service providing systems with the image processing device;

storing by the mediation system, coordination information indicating a coordination state between at least the service providing system and the image processing device;

making by the mediation system, an acquisition request for the coordination state between the image processing device and the service providing system to the image processing device via the user device;

generating by the mediation system, a script for causing the user device to authenticate in an authentication method to which the service providing system serving as a coordination destination corresponds when the coordination instruction is accepted and transmitting the generated script to the user device;

updating by the mediation system, the stored coordination information based on the coordination state transmitted from the image processing device via the user device in response to the acquisition request for the coordination state;

displaying by the user device, an authentication information input screen corresponding to the service providing system specified by executing the script transmitted from the mediation system, wherein authentication information input screens are presented for respective service providing systems of the plurality of service providing systems;

transmitting by the user device, authentication information input on the authentication information input screen or an authentication token issued by the service providing system depending on the input of authentication information on the authentication information input screen to an image processing device specified by the script;

receiving by the image processing device, the authentication information or the authentication token from a transmission unit provided in the user device and saving the authentication information or the authentication token; and receiving by the image processing device, authentication from the service providing system using the saved authentication information or authentication token.

7. A non-transitory storage medium on which is stored a computer program for making a computer execute a method for controlling an information processing system comprising:

a plurality of service providing systems that provide respective web services in response to a request from a user device;

an image processing device that executes image processing utilizing the web service in coordination with the plurality of service providing systems; and a mediation system that mediates provision of authentication information to be used by the image processing device when the image processing device coordinates with the service providing system, wherein the method comprises:

accepting by the mediation system, a coordination instruction, from the user device, for coordinating a service providing system among the plurality of service providing systems with the image processing device;

storing by the mediation system, coordination information indicating a coordination state between at least the service providing system and the image processing device;

making by the mediation system, an acquisition request for the coordination state between the image processing device and the service providing system to the image processing device via the user device;

generating by the mediation system, a script for causing the user device to authenticate in an authentication method to which the service providing system serving as a coordination destination corresponds when the coordination instruction is accepted and transmitting the generated script to the user device;

updating by the mediation system, the stored coordination information based on the coordination state transmitted from the image processing device via the user device in response to the acquisition request for the coordination state;

displaying by the user device, an authentication information input screen corresponding to the service providing system specified by executing the script transmitted from the mediation system, wherein authentication information input screens are presented for respective service providing systems of the plurality of service providing systems;

transmitting by the user device, authentication information input on the authentication information input screen or an authentication token issued by the service providing system depending on the input of authentication information on the authentication information input screen to an image processing device specified by the script;

receiving by the image processing device, the authentication information or the authentication token from a transmission unit provided in the user device and saving the authentication information or the authentication token; and receiving by the image processing device, authentication from the service providing system using the saved authentication information or authentication token.

8. A user device that is capable of communicating with a plurality of service providing systems, each service providing system including a web service for providing data in response to reception of a provision instruction from an external device, the user device comprising a memory and a processor configured to implement:

a display unit configured to display a screen for selecting, from among a plurality of web services, a web service to be coordinated with an image processing device and makes the image processing device print the data;

an access unit configured to access to an address by executing a command which has been issued for accessing the address in order to receive an authentication provided in the service providing system among the plurality of service providing systems and having the web service selected on the screen, wherein the display unit displays an authentication information input screen corresponding to the service providing system that is an access destination, in response to the access unit having accessed the address, and wherein authentication information input screens are presented for respective service providing systems of the plurality of service providing systems;

a reception unit configured to receive an acquisition request for a coordination state between the image processing device and the service providing system from the external device; and a transmission unit configured to transmit authentication information, which is input via an authentication screen provided by accessing the address, to the service providing system and transmit the acquisition request for the coordination state to the image processing device, wherein the reception unit is further configured to receive the coordination state from the image processing device, wherein the transmission unit is configured to transmit the coordination state to the external device, which includes a storage unit which updates coordination information stored in the storage unit based on the transmitted coordination state, and wherein an authentication token indicating that authentication processing based on the transmitted authentication information is successful is saved in the image processing device.

* * * * *